(12) United States Patent
Nishida et al.

(10) Patent No.: US 9,573,559 B2
(45) Date of Patent: Feb. 21, 2017

(54) FRONT BODY STRUCTURE OF VEHICLE

(71) Applicant: Mazda Motor Corporation, Aki-gun, Hiroshima (JP)

(72) Inventors: Yasuhiko Nishida, Hiroshima (JP); Tetsuya Hisanaga, Hiroshima (JP); Yukihito Takikawa, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/761,608

(22) PCT Filed: Jan. 10, 2014

(86) PCT No.: PCT/JP2014/000082
§ 371 (c)(1),
(2) Date: Jul. 16, 2015

(87) PCT Pub. No.: WO2014/112341
PCT Pub. Date: Jul. 24, 2014

(65) Prior Publication Data
US 2015/0353049 A1 Dec. 10, 2015

(30) Foreign Application Priority Data
Jan. 16, 2013 (JP) .................................. 2013-005577

(51) Int. Cl.
*B60R 21/34* (2011.01)
*B62D 25/08* (2006.01)
*B60H 1/28* (2006.01)

(52) U.S. Cl.
CPC ................. *B60R 21/34* (2013.01); *B60H 1/28* (2013.01); *B62D 25/081* (2013.01); *B60R 2021/343* (2013.01)

(58) Field of Classification Search
CPC ............ B60H 1/00007; B60H 1/00271; B60H 1/00557; B60H 1/00564; B60H 1/26; B60H 1/28; B60R 21/34; B62D 25/081; B62D 25/082
(Continued)

(56) References Cited

U.S. PATENT DOCUMENTS 6,322,440 B1    11/2001   Nakatani

FOREIGN PATENT DOCUMENTS

FR    WO 2013144480 A1 * 10/2013    ......... B60H 1/00564
JP        2000264252 A      9/2000
(Continued)

OTHER PUBLICATIONS

English translation of WO 2013/144480; retreived on Feb. 5, 2015 via PatentTranslate on the EPO website located at www.epo.org.*
(Continued)

*Primary Examiner* — Jason S Daniels
(74) *Attorney, Agent, or Firm* — Alleman Hall McCoy Russell & Tuttle LLP

(57) ABSTRACT

A front body structure of a vehicle includes: a cowl panel supporting a front window member; and an outside air introducing duct of an air conditioner. The cowl panel includes: a protruding portion which is located under a portion supporting the front window member, protrudes in a forward direction, and is provided with an opening portion; and a vertical wall portion extending in a downward direction from a lower end of the protruding portion. The outside air introducing duct includes: an opening connected to the opening portion; and a deformation promoting portion formed on at least one of vehicle-width-direction side surfaces of the outside air introducing duct and configured to promote rearward displacement of the opening when the protruding portion receives a collision load from outside.

5 Claims, 14 Drawing Sheets

(58) Field of Classification Search
USPC ............ 296/187.03, 187.04, 187.09, 190.09, 192,296/208
See application file for complete search history.

(56) References Cited

FOREIGN PATENT DOCUMENTS

| | | |
|---|---|---|
| JP | 2007106310 A | 4/2007 |
| JP | 2007331521 A | 12/2007 |

OTHER PUBLICATIONS

ISA Japanese Patent Office, International Search Report Issued in Patent Application No. PCT/JP2014/000082, Apr. 1, 2014, WIPO, 2 pages.
State Intellectual Property Office of the People's Republic of China, Office Action and Search Report Issued in Application No. 201480004814.0, May 5, 2016, 8 pages. (Submitted with Translation of Search Report).

\* cited by examiner

FRONT BODY STRUCTURE OF VEHICLE

TECHNICAL FIELD

The present invention relates to a front body structure of a vehicle, the front body structure including: a cowl panel supporting a front window member from below; and an outside air introducing duct of an air conditioner, the outside air introducing duct being connected to the cowl panel.

BACKGROUND ART

Generally, a cowl panel is required to have a high degree of freedom of interior design, a glass-supporting stiffness capable of supporting a front window member, and pedestrian protection performance. Based on this, the present inventors are considering adopting in a front body structure of a vehicle, a cowl panel whose cross section perpendicular to a vehicle width direction has a substantially S shape as shown in FIG. 14.

This cowl panel 84 includes a protruding portion 82 and a vertical wall portion 83. The protruding portion 82 protrudes in a forward direction and is located under a portion of the cowl panel 84 which supports a front window member 81. The vertical wall portion 83 extends in a downward direction from a lower end of the protruding portion 82.

Since the cowl panel 84 is configured as above, a large space can be secured behind the protruding portion 82, so that the degree of freedom of the interior design can be improved. In addition, since the protruding portion 82 expands in the forward direction, the glass supporting stiffness can be secured. Further, when a collision load shown by an arrow in FIG. 14 is applied to the cowl panel 84, the protruding portion 82 deforms to absorb collision energy, and then, the vertical wall portion 83 falls in a rearward direction and the downward direction to further absorb the collision energy. Since the cowl panel 84 absorbs the collision energy in two steps, the pedestrian protection performance can be secured.

However, as shown in FIG. 14, in a case where a front end opening portion (so-called duct opening) of an outside air introducing duct 86 of an air conditioner 85 is connected to a passenger seat-side rear surface of the cowl panel 84 via a urethane member 87 and/or the like, the following problems occur. To be specific, when the collision load is applied to the cowl panel 84, the cowl panel 84 deforms as shown by a chain double-dashed line α in FIG. 14. At this time, the outside air introducing duct 86 is sandwiched by the protruding portion 82 of the deformed cowl panel 84 having the substantially S-shaped cross section. Thus, the outside air introducing duct 86 deforms so as to be bent as shown by a dotted line β in FIG. 14 about a bent point β1 in FIG. 14 (this deformation is hereinafter referred to as "bending deformation").

More specifically, because of the bending deformation of the outside air introducing duct 86, a load in a direction perpendicular to an axis extending through a center of a closed cross section of the outside air introducing duct 86, that is, a load in such a direction that the duct 86 is easily crushed, is hardly transferred to portions β2 and β3 located at the air conditioner side of the bent point β1. These portions β2 and β3 receive the collision load mainly in a direction along a central axis of the closed cross section of the duct, the direction being such a direction that the duct 86 is hardly crushed. Therefore, the outside air introducing duct 86 becomes stiff between the cowl panel 84 and a vehicle body. Thus, the front end opening portion of the outside air introducing duct 86 is sandwiched by and stuck in the protruding portion 82 of the cowl panel 84, and this inhibits the deformation of the protruding portion 82 of the cowl panel 84 and the rearward and downward falling of the vertical wall portion 83. As a result, it is presumed that the absorption of the collision energy by the deformation of the cowl panel 84 is inhibited. As above, it was found that a problem occurs, in which in a case where the outside air introducing duct 86 is connected to the cowl panel 84, and even if the front end opening portion and bent point 131 of the outside air introducing duct 86 have deformed, the outside air introducing duct 86 inhibits the absorption of the collision energy by the cowl panel 84.

PTL 1 discloses a front body structure of a vehicle, the front body structure including a front cowl and an air conditioning unit. The front cowl has a U shape in a side view of the vehicle body. The air conditioning unit is configured such that an opening edge portion of an outside air introducing port through which outside air is introduced through an internal space of the front cowl is coupled to a rear vertical wall of the front cowl by bolts. To promote plastic deformation of the front cowl when the front cowl receives an impact, a weak portion having a "dogleg shape" in a side view is formed at each of a vertical-direction intermediate portion of the opening edge portion of the outside air introducing port of a duct of the air conditioning unit and a vertical-direction intermediate portion of a portion of the rear vertical wall to which the opening edge portion is coupled by the bolts. To be specific, according to this conventional structure disclosed in PTL 1, the weak portions prevent the rear vertical wall of the front cowl from becoming too strong since the opening edge portion (corresponding to a front end opening portion of the present invention) of the duct that is high in stiffness is fastened by the bolts. However, PTL 1 does not disclose either of the technical problem and configuration of the present invention.

CITATION LIST

Patent Literature

PTL 1: Japanese Laid-Open Patent Application Publication No. 2007-106310

SUMMARY OF INVENTION

Technical Problem

An object of the present invention is to provide a front body structure of a vehicle, the front body structure being configured to prevent an outside air introducing duct from inhibiting absorption of collision energy by a cowl panel and therefore being able to improve a pedestrian protection performance.

Solution to Problem

A front body structure of a vehicle according to the present invention includes: a cowl panel supporting a front window member; and an outside air introducing duct of an air conditioner, wherein: the cowl panel includes a protruding portion which is located under a portion supporting the front window member, protrudes in a forward direction, and is provided with an opening portion, and a vertical wall portion extending in a downward direction from a lower end of the protruding portion; and the outside air introducing duct includes an opening connected to the opening portion, and a deformation promoting portion formed on at least one of vehicle-width-direction side surfaces of the outside air introducing duct and configured to promote rearward displacement of the opening when the protruding portion receives a collision load from outside. The deformation promoting portion may be a slit formed on the side surface of the duct, a thin portion, or a V-shaped notch. In a case where the slit is formed on the side surface of the duct, it is preferable that both front and rear surfaces of the slit be covered with tapes or the like which are air-impermeable and do not affect a deformation promotion performance.

According to the above configuration, when the cowl panel receives the collision load, the opening side of the outside air introducing duct, that is, the front end portion of the outside air introducing duct moves toward the rear side of the vehicle body, and the entire outside air introducing duct deforms so as to be crushed in a longitudinal direction (this deformation is hereinafter referred to as "rearward deformation"). With this, the outside air introducing duct does not inhibit the absorption of the energy by the deformation of the cowl panel. Since the outside air introducing duct can absorb the collision energy by the rearward deformation, the pedestrian protection performance can be improved.

According to one aspect of the present invention, the deformation promoting portion includes a first weak portion extending in an upward/downward direction.

According to the above configuration, by the first weak portion, the outside air introducing duct does not inhibit the absorption of the energy by the deformation of the cowl panel. Since the outside air introducing duct can absorb the collision energy by the rearward deformation, the pedestrian protection performance can be improved.

According to another aspect of the present invention, the deformation promoting portion further includes: a second weak portion located behind the first weak portion and extending in the upward/downward direction; and a third weak portion extending in a forward/rearward direction and connecting a lower end of the first weak portion and a lower end of the second weak portion to each other.

According to the above configuration, the first weak portion, the second weak portion, and the third weak portion are continuously formed in a U shape in a side view. Therefore, when the collision load is applied to the cowl panel, a portion of the outside air introducing duct which is surrounded by the first, second, and third weak portions moves in a rearward direction as if a lid opens. On this account, the rearward deformation of the outside air introducing duct is further facilitated.

According to yet another aspect of the present invention, the outside air introducing duct includes a corner portion between one of the side surfaces and an upper surface of the outside air introducing duct, and the deformation promoting portion is formed so as to continuously extend from the side surface through the corner portion to the upper surface.

According to the above configuration, the deformation promoting portion is formed so as to continuously extend from the side surface of the duct through the corner portion to the upper surface of the duct. Therefore, even in a case where the outside air introducing duct includes the corner portion, the outside air introducing duct can perform the rearward deformation.

According to still another aspect of the present invention, the deformation promoting portion is located behind the protruding portion of the cowl panel.

According to the above configuration, the deformation promoting portion is located behind the protruding portion of the cowl panel. Therefore, when the collision load is applied to the cowl panel, the rearward deformation can be performed while the outside air introducing duct located inside the protruding portion of the cowl panel moves in the rearward direction. Therefore, the pedestrian protection performance can be further improved.

Advantageous Effects of Invention

As above, according to the present invention, when the protruding portion receives the collision load from outside, the opening of the outside air introducing duct moves in the rearward direction. Thus, the rearward deformation occurs. Therefore, according to the present invention, the outside air introducing duct does not inhibit the absorption of the collision energy by the cowl panel, so that the pedestrian protection performance can be improved.

DESCRIPTION OF EMBODIMENTS

An object of the present invention is to prevent an outside air introducing duct from inhibiting absorption of collision energy by a cowl panel and thereby improve a pedestrian protection performance. This object is realized by a configuration including: a cowl panel supporting a front window member; and an outside air introducing duct of an air conditioner, wherein: the cowl panel includes a protruding portion which is located under a portion supporting the front window member, protrudes in a forward direction, and is provided with an opening portion, and a vertical wall portion extending downward from a lower end of the protruding portion; and the outside air introducing duct includes an opening connected to the opening portion, and a deformation promoting portion formed on at least one of vehiclewidth-direction side surfaces of the outside air introducing duct and configured to promote rearward displacement of the opening when the protruding portion receives a collision load from outside.

Figure 1:
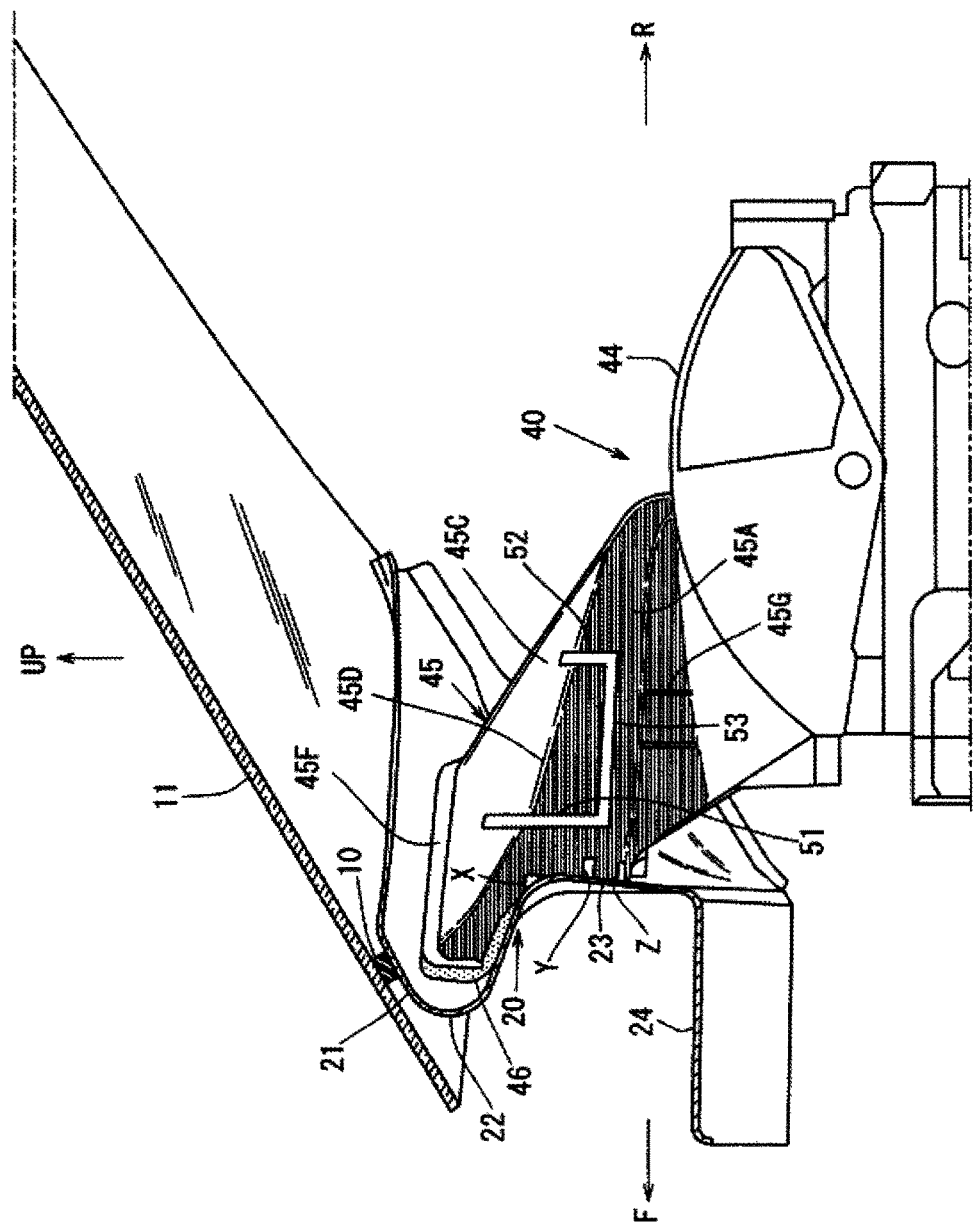
FIG. 1 is a side view showing a front body structure of a vehicle of the present invention.
Figure 2:
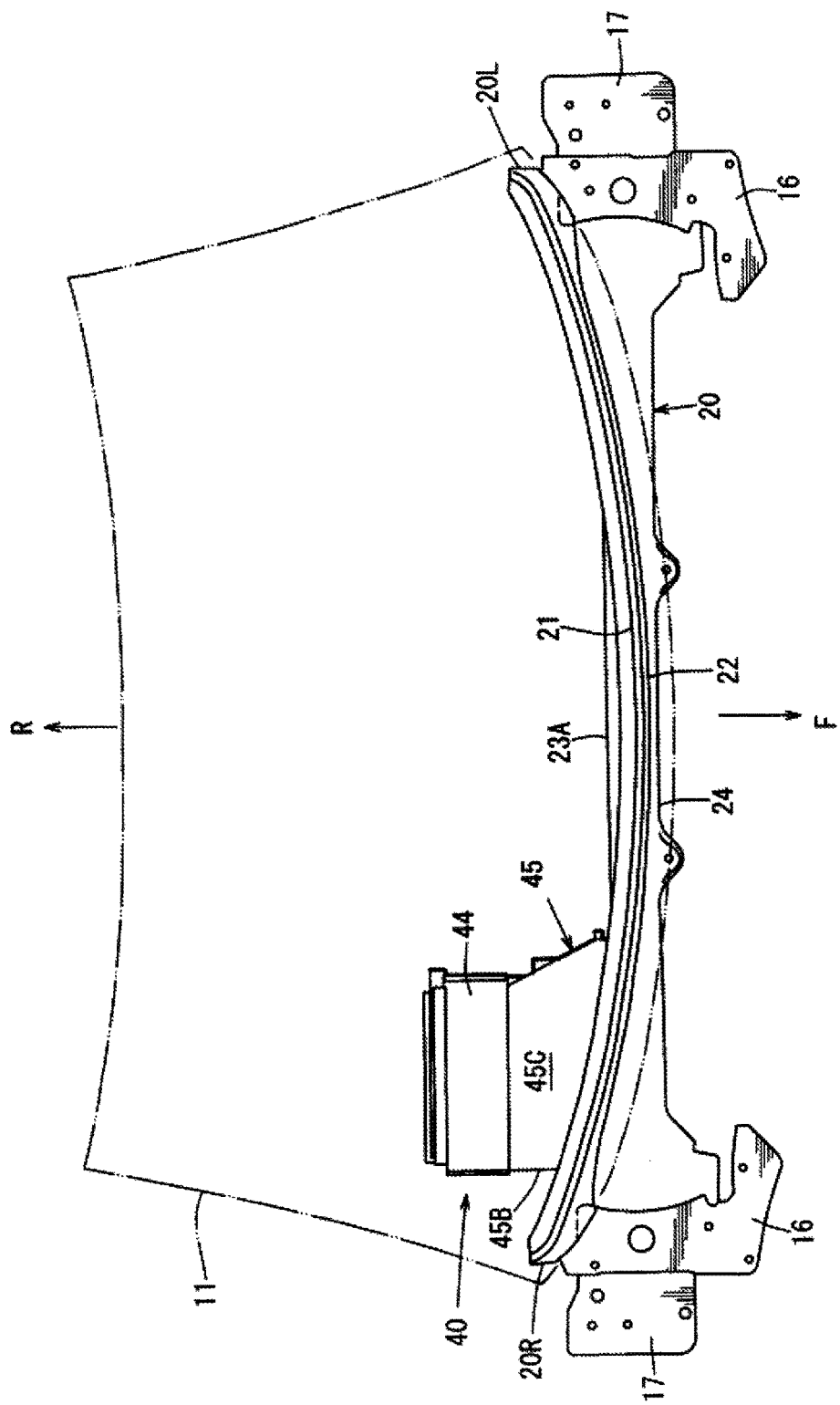
FIG. 2 is a plan view of FIG. 1.
Figure 3:
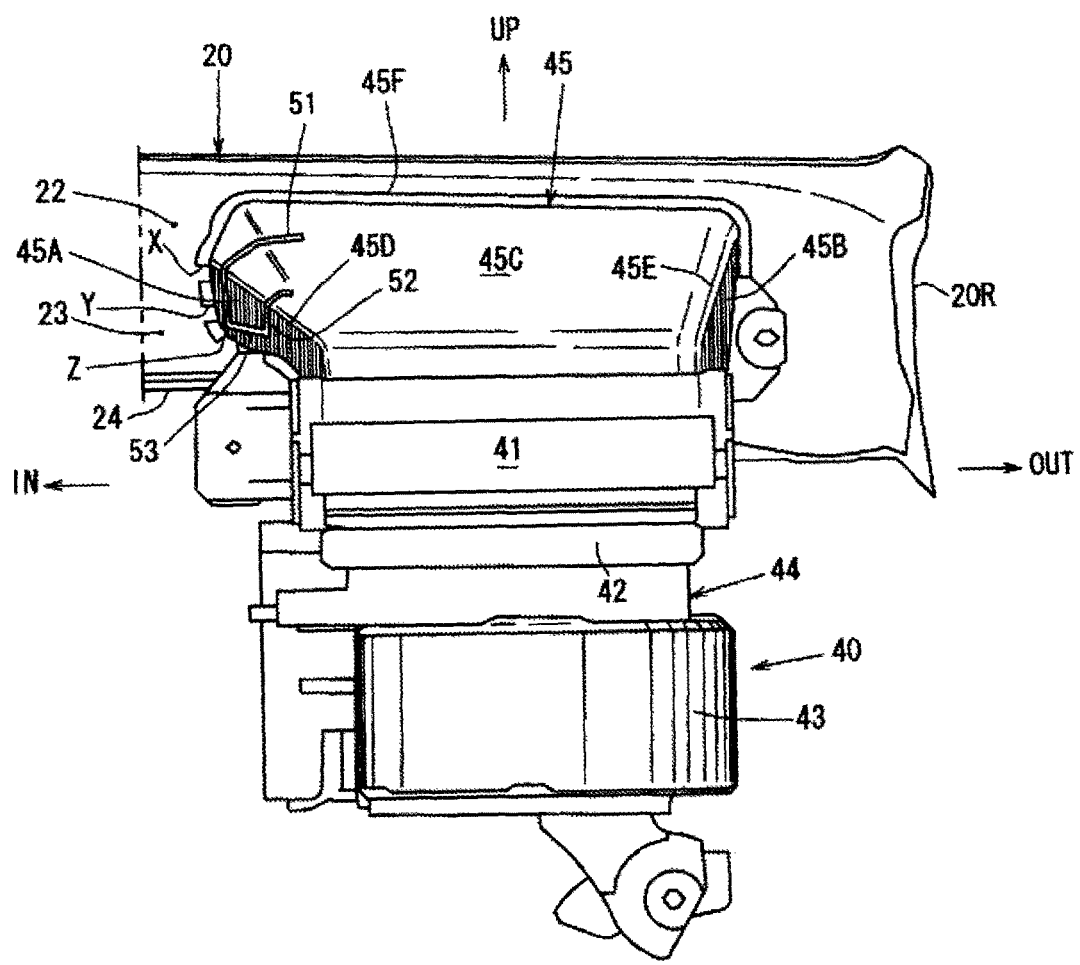
FIG. 3 is a rear view showing the major components of the front body structure of the vehicle.
Figure 4:
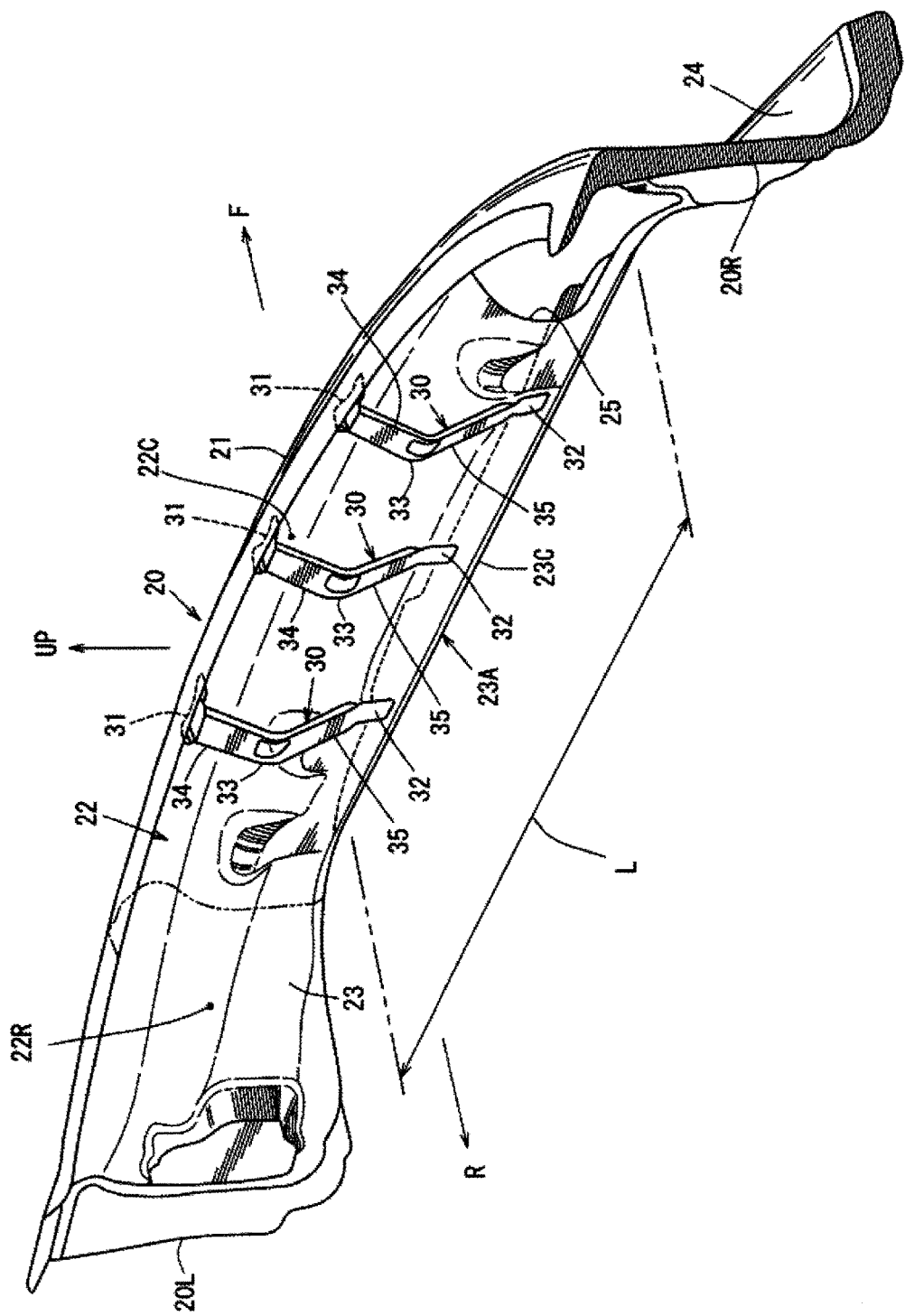
FIG. 4 is a perspective view showing a cowl panel when viewed from an upper rear side of the vehicle.
Figure 5:
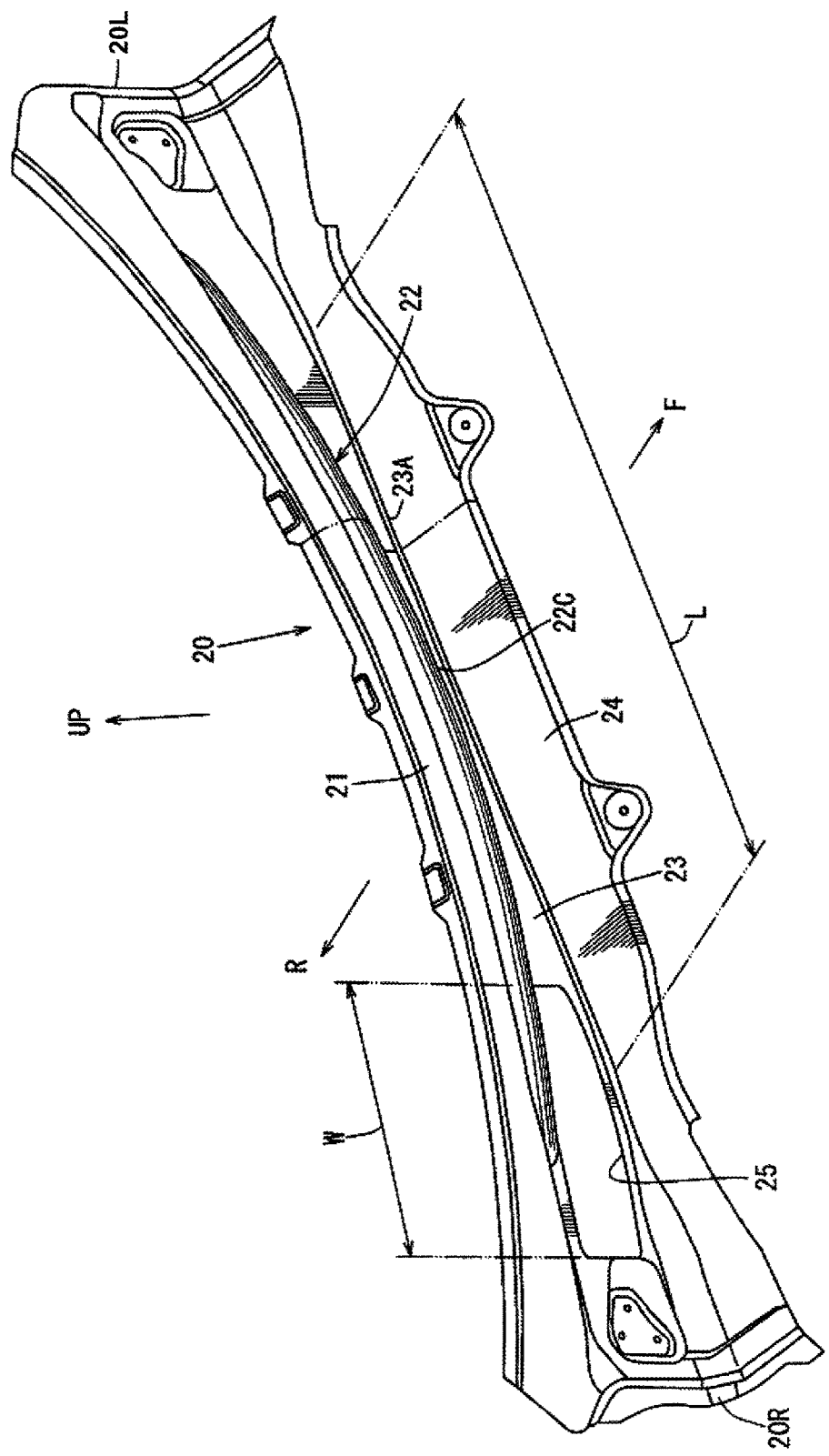
FIG. 5 is a perspective view showing the cowl panel when viewed from an upper front side of the vehicle.
Figure 6:
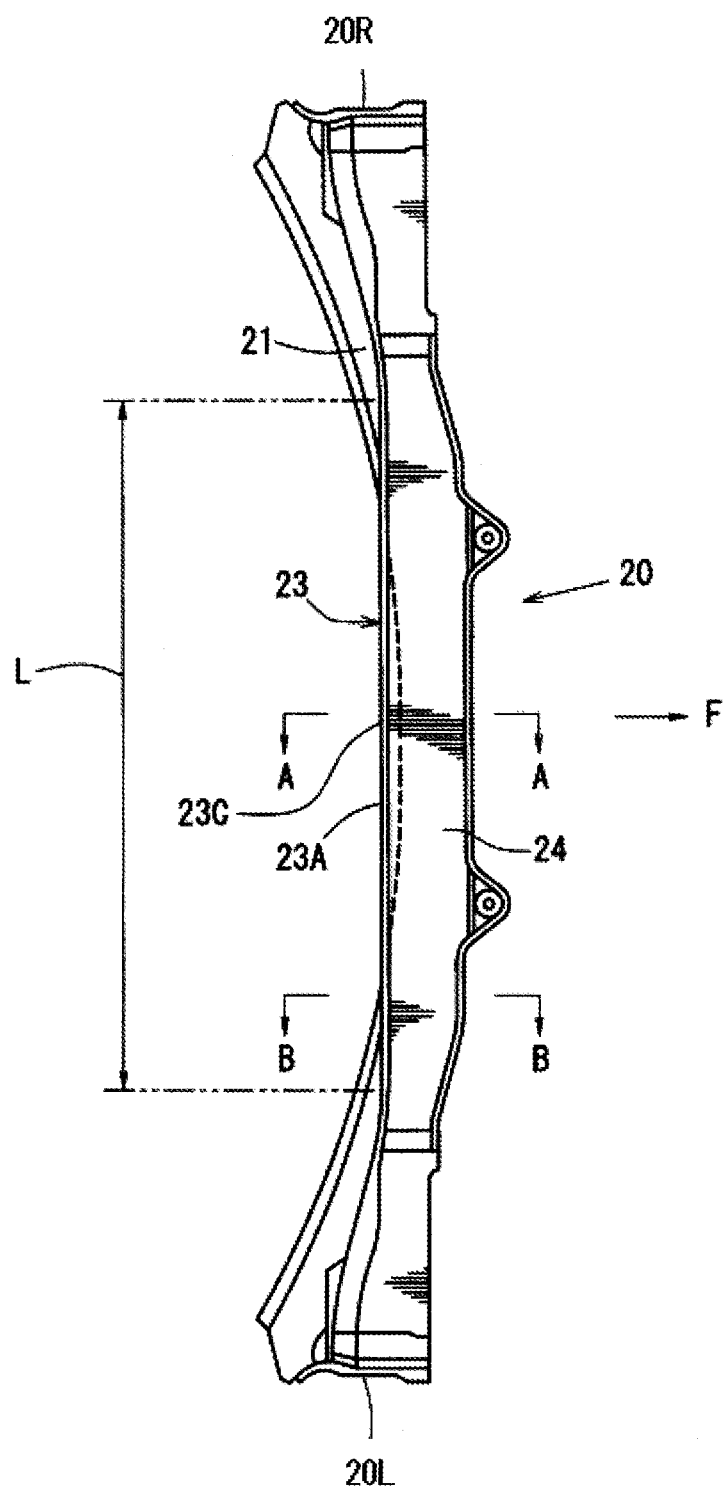
FIG. 6 is a bottom view of the cowl panel.
Figure 7:
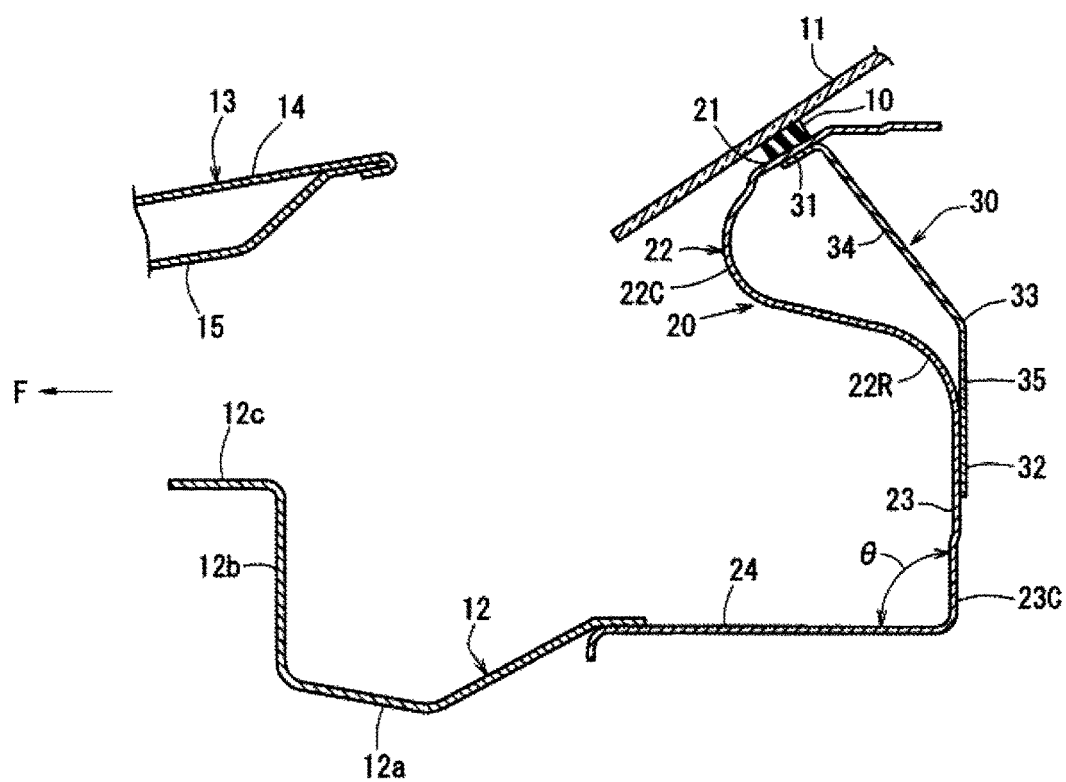
FIG. 7 is a cross-sectional view taken along a line A-A of FIG. 6.
Figure 8:
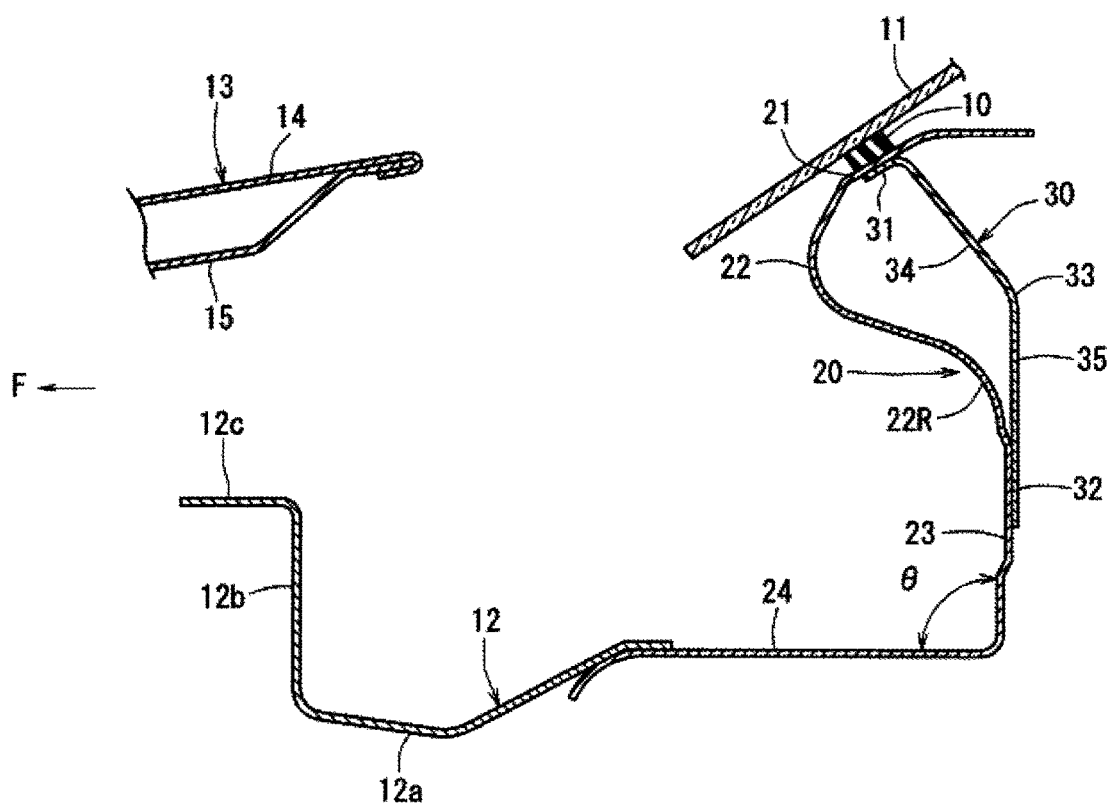
FIG. 8 is a cross-sectional view taken along a line B-B of FIG. 6.

One embodiment of the present invention will be explained in detail in reference to the drawings. Each of FIGS. 1 to 8 shows a front body structure of a vehicle. FIG. 1 is a side view. FIG. 2 is a plan view of FIG. 1. FIG. 3 is a rear view of major components. FIGS. 4 and 5 are perspective views showing the cowl panel when viewed from different directions. FIG. 6 is a bottom view of the cowl panel. FIG. 7 is a cross-sectional view taken along line A-A of FIG. 6. FIG. 8 is a cross-sectional view taken along line B-B of FIG. 6. In the drawings, a reference sign 20L denotes a vehicle-width-direction left end of a cowl panel 20, and a reference sign 20R denotes a vehicle-width-direction right end of the cowl panel 20. Further, in the drawings, an arrow F denotes a vehicle forward direction (hereinafter may be simply referred to as a "forward direction"). An arrow R denotes a vehicle rearward direction (hereinafter may be simply referred to as a "rearward direction"). An arrow IN denotes an inner side in a vehicle width direction. An arrow OUT denotes an outer side in the vehicle width direction. An arrow UP denotes a vehicle upper side. As shown in FIGS. 1, 2, 7, and 8, the cowl panel 20 supports a lower portion of a front window member 11 from below via an adhesive 10 that is a filler over substantially an entire width in the vehicle width direction.

The cowl panel 20 has a vehicle-width-direction length substantially equal to a vehicle-width-direction length of the lower portion of the front window member 11. The cowl panel 20 includes an upper surface portion 21, a protruding portion 22, a vertical wall portion 23, and a lower surface portion 24. The upper surface portion 21 is a portion to which the front window member 11 is joined. The protruding portion 22 is a portion connected to a lower side of the upper surface portion 21, protruding in a circular-arc shape in the vehicle forward direction, and having a substantially C shape in a side view. The vertical wall portion 23 is a portion connected to a lower portion of the protruding portion 22 via a rounded corner portion 22R of the lower portion of the protruding portion 22 and extending in the downward direction from the rounded corner portion 22R. The lower surface portion 24 is a portion extending in the vehicle forward direction from a lower end of the vertical wall portion 23.

As shown in FIG. 5, the protruding portion 22 expands toward a vehicle front side as the protruding portion 22 extends toward a vehicle-width-direction middle portion 22C. To be specific, an expanding amount of the protruding portion 22 in the forward direction is at a maximum at the vehicle-width-direction middle portion 22C, and the expanding amount gradually decreases as the protruding portion 22 extends from the vehicle-width-direction middle portion 22C toward left and right sides along the vehicle width direction. Further, as shown in FIG. 6, a portion of the lower end of the vertical wall portion 23 which is located in the vicinity of at least a vehicle-width-direction middle portion 23C is formed to have a substantially linear shape extending in the vehicle width direction. With this, when the collision load is applied to the cowl panel 20, the vertical wall portion 23 easily falls in the rearward direction. In the present embodiment, as shown in FIGS. 4, 5, and 6, a substantially linear portion 23A corresponds to a portion of the lower end of the vertical wall portion 23 which is more than half of the entire width of the lower end of the vertical wall portion 23 in the vehicle width direction. The substantially linear portion 23A has a vehicle-width-direction length L.

As shown in FIGS. 1, 7, and 8, the upper surface portion 21, the protruding portion 22, the vertical wall portion 23, and the lower surface portion 24 are integrally formed such that in a side view, a cross-sectional shape thereof (a shape of a cross section perpendicular to the vehicle width direction) is a substantially S shape. With this, a wide space behind the cowl panel 20 can be secured, so that the degree of freedom of the interior design can be improved. Since the protruding portion 22 is formed so as to expand in the forward direction, the supporting stiffness for the front window member 11 can be secured, that is, the glass supporting stiffness can be secured. Further, when the collision load is applied to the cowl panel 20, the protruding portion 22 deforms from a normal state (state before the deformation) shown in FIG. 10A to a state shown in FIG. 10B. Thus, the cowl panel 20 absorbs the collision energy. With this, the cowl panel 20 can secure the pedestrian protection performance. Both vehicle-width-direction side edge portions of the front window member 11 are supported by front pillars (not shown). The front pillar herein is a member extending from an upper end of a hinge pillar to a roof side rail in the vehicle rearward direction and the upward direction.

Figure 10C:
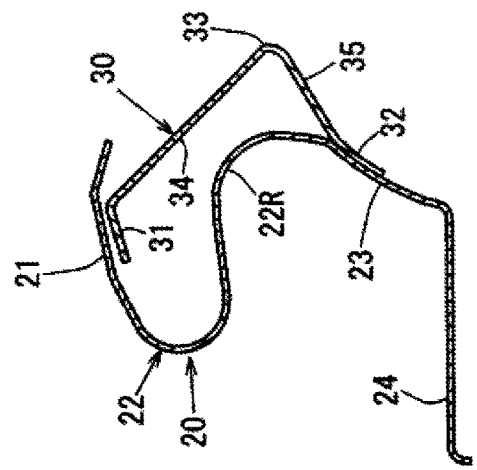
FIG. 10C is a side view showing the cowl panel at a late stage of the deformation.
Figure 10B:
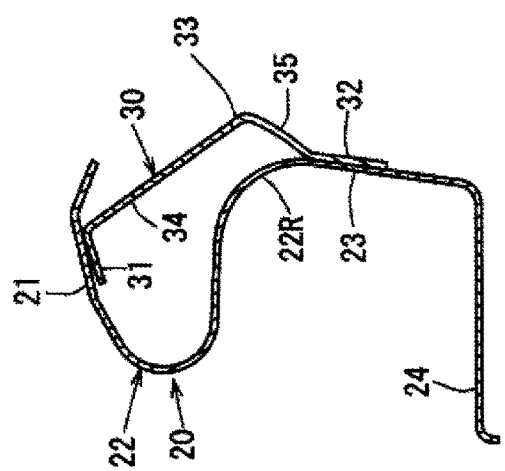
FIG. 10B is a side view showing the cowl panel at an initial stage of the deformation.
Figure 10A:
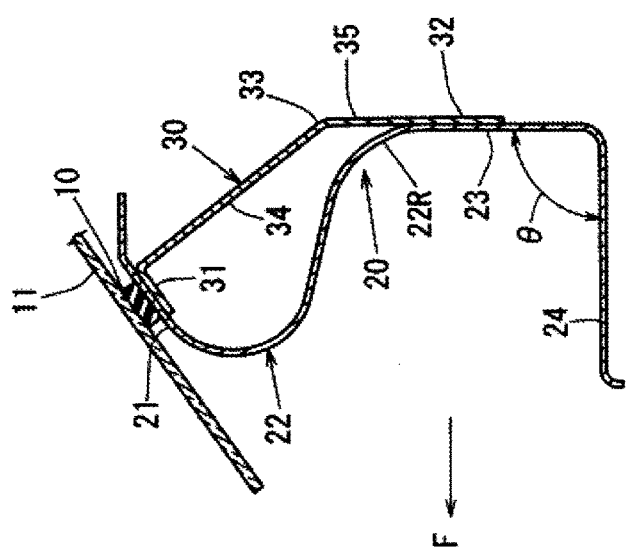
FIG. 10A is a side view showing the cowl panel before deformation.

As shown in FIGS. 7, 8, and 10A, the lower surface portion 24 of the cowl panel 20 is formed substantially horizontally. An angle θ between the lower surface portion 24 and the vertical wall portion 23 is not less than 90 degrees, preferably substantially 90 degrees. With this, when the collision load is applied to the cowl panel 20, the vertical wall portion 23 easily falls in the rearward direction. Further, it is preferable that a distance between the upper portion and lower portion of the cowl panel 20 having the substantially S shape be short. In this case, a formation yield of the cowl panel 20 at the time of press forming can be improved.

As shown in FIGS. 4, 7, and 8, a plurality of reinforcing members 30 are provided at a vehicle rear side of the cowl panel 20. In the present embodiment, the reinforcing members 30 are respectively provided at three positions that are: a rear surface of the vehicle-width-direction middle portion of the cowl panel 20; a rear surface of a portion of the cowl panel 20, the portion being offset from the vehicle-width-direction middle portion to the left side in the vehicle width direction by a predetermined distance; and a rear surface of a portion of the cowl panel 20, the portion being offset from the vehicle-width-direction middle portion to the right side in the vehicle width direction by the predetermined distance. These three reinforcing members 30 are located in front of the substantially linear portion 23A. Each of the reinforcing members 30 includes a first joint portion 31, a second joint portion 32, and a bent portion 33. The first joint portion 31 is a portion located at an upper portion of the reinforcing member 30 and joined to a lower side of the upper surface portion 21 of the cowl panel 20. The second joint portion 32 is a portion located at a lower portion of the reinforcing member 30 and joined to a rear surface (i.e., a back surface) of the vertical wall portion 23 of the cowl panel 20. The bent portion 33 is a portion located between the first joint portion 31 and the second joint portion 32 and projecting in the rearward direction when the collision load is applied to the cowl panel 20.

The first joint portion 31 is inclined such that a front portion thereof is low, and a rear portion thereof is high. The first joint portion 31 is located at a joint portion between the upper surface portion 21 of the cowl panel 20 and the front window member 11, that is, in the vicinity of an arrangement position of the adhesive 10. Especially, the reinforcing member 30 located at the vehicle-width-direction middle portion is formed such that the bent portion 33 is located under a vertically middle portion between the first joint portion 31 and the second joint portion 32.

As described above, the cowl panel 20 having the substantially S-shaped cross section can secure the pedestrian protection performance while improving the degree of freedom of the interior design. In addition, by further providing the reinforcing members 30, the glass supporting stiffness improves, and an NVH (Noise, Vibration, and Harshness (ride quality)) performance can be secured. Especially, booming noise can be reduced.

As shown in FIGS. 7 and 8, the reinforcing member 30 includes: an upper piece portion 34 located between the first joint portion 31 and the bent portion 33; and a lower piece portion 35 located between the bent portion 33 and the second joint portion 32. An angle between the upper piece portion 34 and the lower piece portion 35 is an obtuse angle. The upper piece portion 34 is inclined such that a front portion thereof is high, and a rear portion thereof is low. The lower piece portion 35 is formed so as to extend substantially vertically. Further, as shown in FIGS. 7 and 8, the upper piece portion 34 of the reinforcing member 30 is formed so as to be substantially perpendicular to the front window member 11 (i.e., formed at a substantially right angle to the front window member 11). With this, the glass supporting stiffness of the cowl panel 20 can be further improved.

As shown in FIG. 4, a vehicle-width-direction size of the first joint portion 31 is larger than the vehicle-width-direction size of the upper piece portion 34. Since the wide first joint portion 31 is joined to a lower surface of the upper surface portion 21 of the cowl panel 20, the glass supporting stiffness of the cowl panel 20 can be further improved. In addition, since a work space for a welding gun can be secured, joining work can be easily performed.

As shown in FIGS. 7 and 8, a front portion of the lower surface portion 24 of the cowl panel 20 is joined to a cowl front panel 12 whose cross section perpendicular to the vehicle width direction has a substantially concave shape. The cowl front panel 12 and the cowl panel 20 having the substantially S-shaped cross section constitute an open cowl having an open cross section. The cowl front panel 12 is formed by integrating a lower surface portion 12a, a vertical wall portion 12b, and an upper surface portion 12c. The lower surface portion 12a is a portion located at a rear portion of the cowl front panel 12 and joined to an upper surface of the front portion of the lower surface portion 24 of the cowl panel 20. The vertical wall portion 12b is a portion extending in the upward direction from a front end of the lower surface portion 12a. The upper surface portion 12c is a portion extending in the forward direction from an upper end of the vertical wall portion 12b.

A dash panel (not shown) extending in the upward/downward direction and the vehicle width direction stands between the lower surface portion 24 of the cowl panel 20 and a vehicle body floor panel. The dash panel divides an inside of the vehicle in the forward/rearward direction. A front side of the dash panel is an engine room, and a rear side of the dash panel is a vehicle interior. The engine room is covered with a hood 13 shown in FIGS. 7 and 8 so as to be openable and closable. The hood 13 includes: an outer panel 14 constituting an outer surface; and an inner panel 15 joined to the outer panel 14 and constituting an engine room-side surface. Rear end portions of both vehicle-width-direction ends of the hood 13 are coupled to the vehicle body via hood hinges (not shown). To be specific, the hood 13 is supported by the hood hinges so as to be openable and closable using the rear end portions as fulcrums.

The vehicle of the present embodiment is a left hand drive vehicle in which a driver's seat is located at a left side in the vehicle, and a passenger seat is located at a right side in the vehicle. As shown in FIGS. 4 and 5, an opening portion 25 through which outside air is taken into the vehicle is formed at the cowl panel 20 so as to be located at the passenger seat side. The opening portion 25 is formed so as to extend from the protruding portion 22 to an upper portion of the vertical wall portion 23. As shown in FIG. 5, the opening portion 25 has a horizontally long shape and a vehicle-width-direction size W.

As shown in FIGS. 1, 2, and 3, an air conditioning unit 40 that is the air conditioner is provided at the vehicle interior side of the cowl panel 20. The air conditioning unit 40 includes an air conditioner main body 44 and an outside air introducing duct 45. The air conditioner main body 44 includes filters 41 and 42 and a blower 43. The outside air introducing duct 45 introduces the outside air to the air conditioner main body 44. The outside air introducing duct 45 and an outer housing of the air conditioner main body 44 are integrally formed by synthetic resin.

As shown in FIG. 1, the outside air introducing duct 45 extends from the air conditioner main body 44 in the forward direction and the upward direction. A front end portion of the outside air introducing duct 45 is connected to an edge of the opening portion 25 of the cowl panel 20 via a urethane member 46. The opening portion 25 of the cowl panel 20 and an opening (duct opening) of the front end portion of the outside air introducing duct 45 communicate with each other. The urethane member 46 is shown only in FIG. 1 and is not shown in the other drawings.

As shown in FIG. 3, the outside air introducing duct 45 is formed by integrating: a left side surface 45A located at the inner side in the vehicle width direction; a right side surface 45B located at the outer side in the vehicle width direction; an upper surface 45C located at an upper side; and a lower surface located at a lower side. Further, the outside air introducing duct 45 is made of synthetic resin and is hollow. In the outside air introducing duct 45, a corner portion 45D is formed between the left side surface 45A and the upper surface 45C. The corner portion 45D is a ridge line portion and extends in a substantially forward/rearward direction. Further, a corner portion 45E is formed between the right side surface 45B and the upper surface 45C. The corner portion 45E is a ridge line portion and extends in a substantially forward/rearward direction.

Further, a flange portion 45F located at an outer periphery of the duct opening is formed at the front end portion of the outside air introducing duct 45. The flange portion 45F is formed integrally with the other portions of the outside air introducing duct 45. The urethane member 46 is adhered to a front surface of the flange portion 45F. The flange portion 45F of the outside air introducing duct 45 closely contacts a back surface (rear surface) of the edge of the opening portion 25 of the cowl panel 20 via the urethane member 46. With this, it is possible to prevent the generation of noise due to vibration and the generation of a gap between the cowl panel 20 and the outside air introducing duct 45. Although the urethane member 46 is adhered to the front surface of the flange portion 45F, the urethane member 46 is not adhered to the back surface of the edge of the opening portion 25 of the cowl panel 20. With this, the rearward deformation of the outside air introducing duct 45 is not inhibited.

Figure 9:
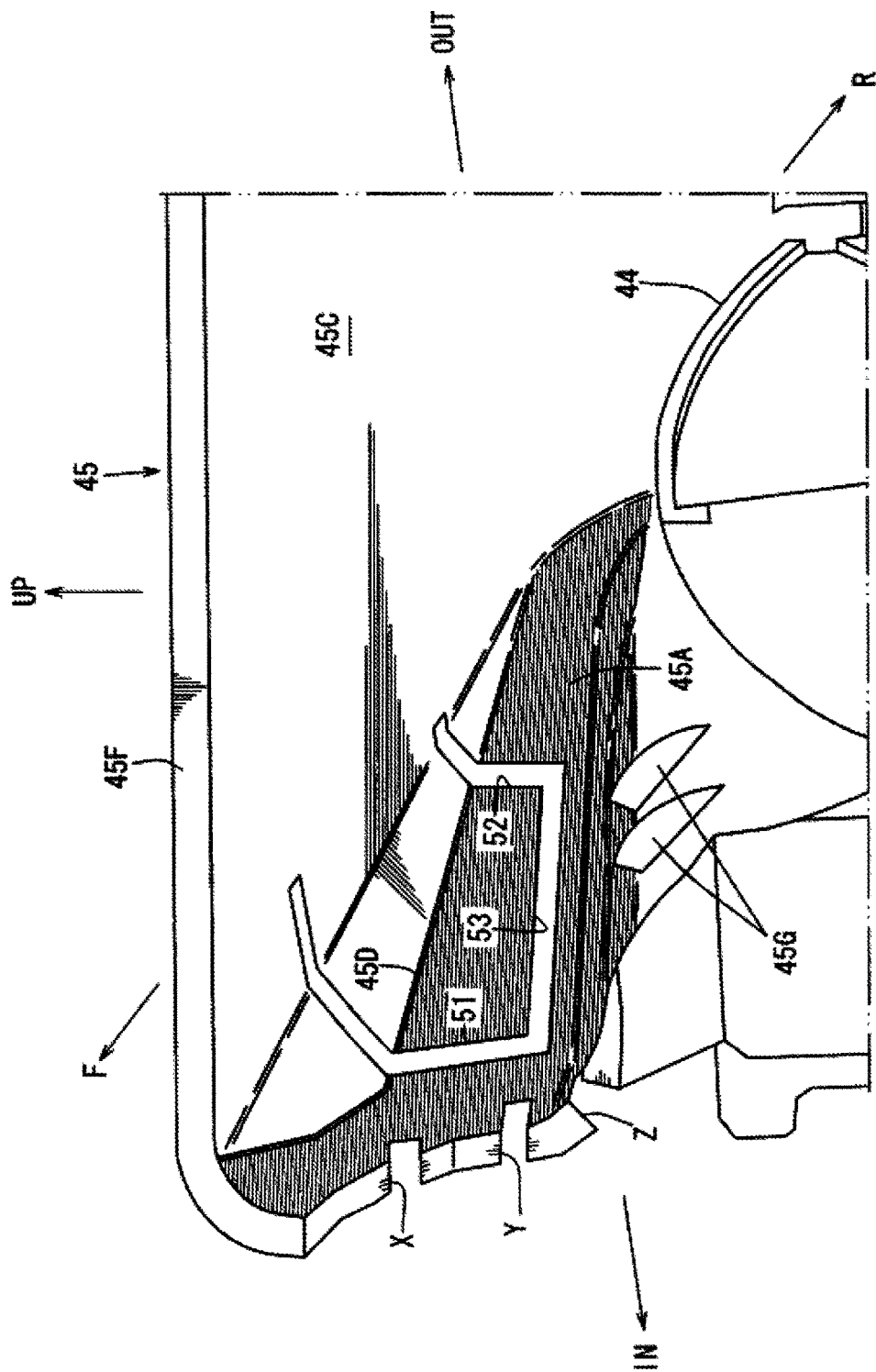
FIG. 9 is a perspective view showing an outside air introducing duct.

FIG. 9 is an enlarged perspective view showing major components of the outside air introducing duct 45. As shown in FIGS. 1, 3, and 9, the deformation promoting portion is provided on at least one of the vehicle-width-direction side surfaces of the outside air introducing duct 45, that is, on the left side surface 45A located at the inner side in the vehicle width direction. When the protruding portion 22 of the cowl panel 20 receives the collision load from outside, the deformation promoting portion promotes the rearward deformation of the outside air introducing duct 45. The deformation promoting portion includes a first weak portion 51, a second weak portion 52, and a third weak portion 53. The first weak portion 51 is a slit located close to the opening portion 25 in a side view (see FIG. 1), extending in the upward/downward direction, and having a predetermined forward/rearward width. The second weak portion 52 is a slit located at a rear side of the outside air introducing duct 45, extending in the upward/downward direction, and having a predetermined forward/rearward width. The third weak portion 53 is a slit having a predetermined upward/downward width. The third weak portion 53 extends in the vehicle forward/rearward direction and connects a lower end of the first weak portion 51 and a lower end of the second weak portion 52 to each other. As above, the deformation promoting portion is formed to have a U shape in a side view (see FIG. 1) by the first weak portion 51, the second weak portion 52, and the third weak portion 53.

For example, weak tapes which are air-impermeable and do not affect a deformation promotion performance are put on the first, second, and third weak portions 51, 52, and 53 from both front and rear surfaces (both inner and outer surfaces of the duct) so as to entirely cover the first, second, and third weak portions 51, 52, and 53, or weak tapes are respectively put on the first, second, and third weak portions 51, 52, and 53 from both inner and outer surfaces of the duct along the shapes of the weak portions. To facilitate understanding of the shapes of the weak portions 51, 52, and 53, the tapes (weak members) are not shown.

As shown in FIG. 9, each of the first weak portion 51 and the second weak portion 52 is formed so as to continuously extend from the left side surface 45A through the corner portion 45D to the upper surface 45C of the outside air introducing duct 45.

As shown in FIG. 1, the first weak portion 51 is located behind a rear end portion of the protruding portion 22 of the cowl panel 20. As above, the first weak portion 51 is formed at the outside air introducing duct 45. Therefore, when the protruding portion 22 receives the collision load from outside, the opening of the outside air introducing duct 45 can move toward the rear side of the vehicle body. As a result, the outside air introducing duct 45 can be prevented from being sandwiched by the protruding portion 22 of the cowl panel 20.

The first weak portion 51, the second weak portion 52, and the third weak portion 53 are formed in a U shape as a whole. Therefore, when the collision load is applied to the cowl panel 20, a portion surrounded by the weak portions 51, 52, and 53 moves in the rearward direction as if a lid opens. With this, the rearward deformation of the outside air introducing duct 45 located inside the protruding portion 22 is facilitated. To be specific, the bending deformation of the outside air introducing duct 45 can be prevented. In addition, the first weak portion 51 is located behind the rear end portion of the protruding portion 22 of the cowl panel 20. Therefore, when the collision load is applied to the cowl panel 20, a portion of the outside air introducing duct 45 which is located inside the protruding portion 22 easily moves in the rearward direction, so that this portion is hardly sandwiched by the protruding portion 22.

In addition, the weak portions 51, 52, and 53 are covered with the tapes or the like. With this, unnecessary outside air can be prevented from flowing into the outside air introducing duct 45 by a simple configuration, so that an air condition performance can be prevented from deteriorating. Since the tapes or the like to be used are the weak members, the rearward deformation of the outside air introducing duct 45 is not inhibited. Further, a plurality of cutouts X, Y, and Z are formed at a portion of the flange portion 45F of the outside air introducing duct 45 so as to be spaced apart from one another in the upward/downward direction, the portion being opposed to the left side surface 45A. Each of these cutouts X, Y, and Z is formed so as to extend from the flange portion 45F to a front end portion of the left side surface 45A. With this, it is possible to prevent the bending deformation that is a phenomenon in which a lower portion of the flange portion 45F moves little in the rearward direction, and only an upper portion of the flange portion 45F falls in the forward direction. Therefore, the flange portion 45F is hardly sandwiched by the cowl panel 20, and the rearward deformation of the outside air introducing duct 45 is even less inhibited. The number of cutouts is only required to be plural. For example, even in a case where only two cutouts X and Y are formed, the rearward deformation of the outside air introducing duct is hardly inhibited.

According to the front body structure of the vehicle configured as above, when the collision load is applied to a lower end portion of the front window member 11 from above (see an arrow in FIG. 11), the cowl panel 20 changes from the normal state shown in FIG. 10A to the state shown in FIG. 10B where the protruding portion 22 is folded. With this, the cowl panel 20 can absorb the collision energy. When the collision load is further applied to the cowl panel 20, the cowl panel 20 changes from the state shown in FIG. 10B to a state shown in FIG. 10C where the vertical wall portion 23 falls in the rearward direction. With this, the cowl panel 20 can further absorb the collision energy.

Figure 11:
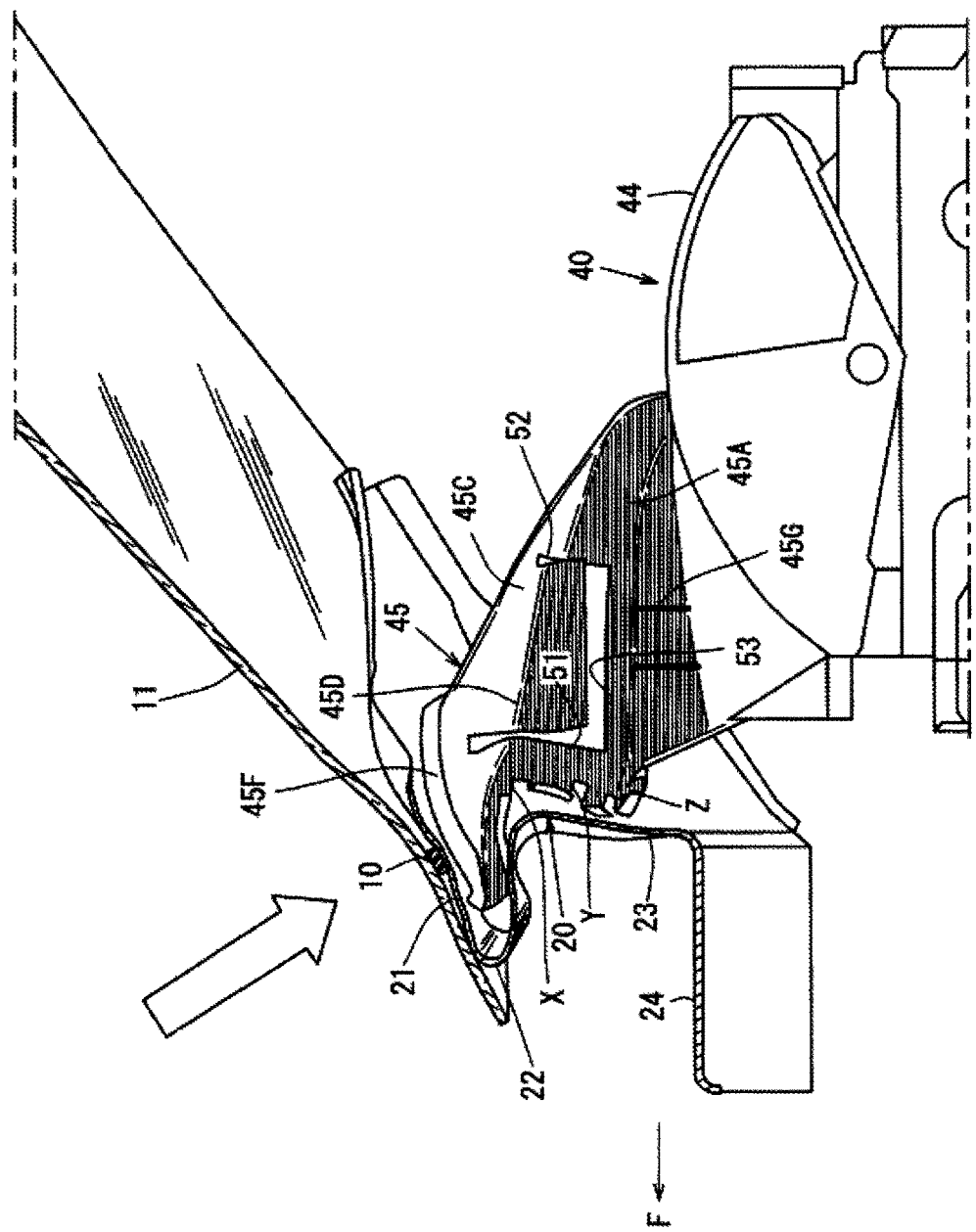
FIG. 11 is a side view of the front body structure of the vehicle after the deformation.

As shown in FIG. 1, the outside air introducing duct 45 is connected to the passenger seat side of the cowl panel 20. The first weak portion 51 (deformation promoting portion) constituted by the slit extending in the upward/downward direction and having the predetermined forward/rearward width is formed at a portion of the left side surface 45A of the outside air introducing duct 45, the portion being located behind the protruding portion 22 and close to the vertical wall portion 23. Therefore, when the collision load is applied to the cowl panel 20, a portion of the outside air introducing duct 45 which is close to the opening is displaced in the rearward direction as shown in FIG. 11 from the state shown in FIG. 1. On this account, the outside air introducing duct 45 can be prevented from being sandwiched by the protruding portion 22 of the cowl panel 20. With this, the protruding portion 22 appropriately deforms to absorb the collision energy. Thus, the pedestrian protection performance can be improved.

Figure 12:
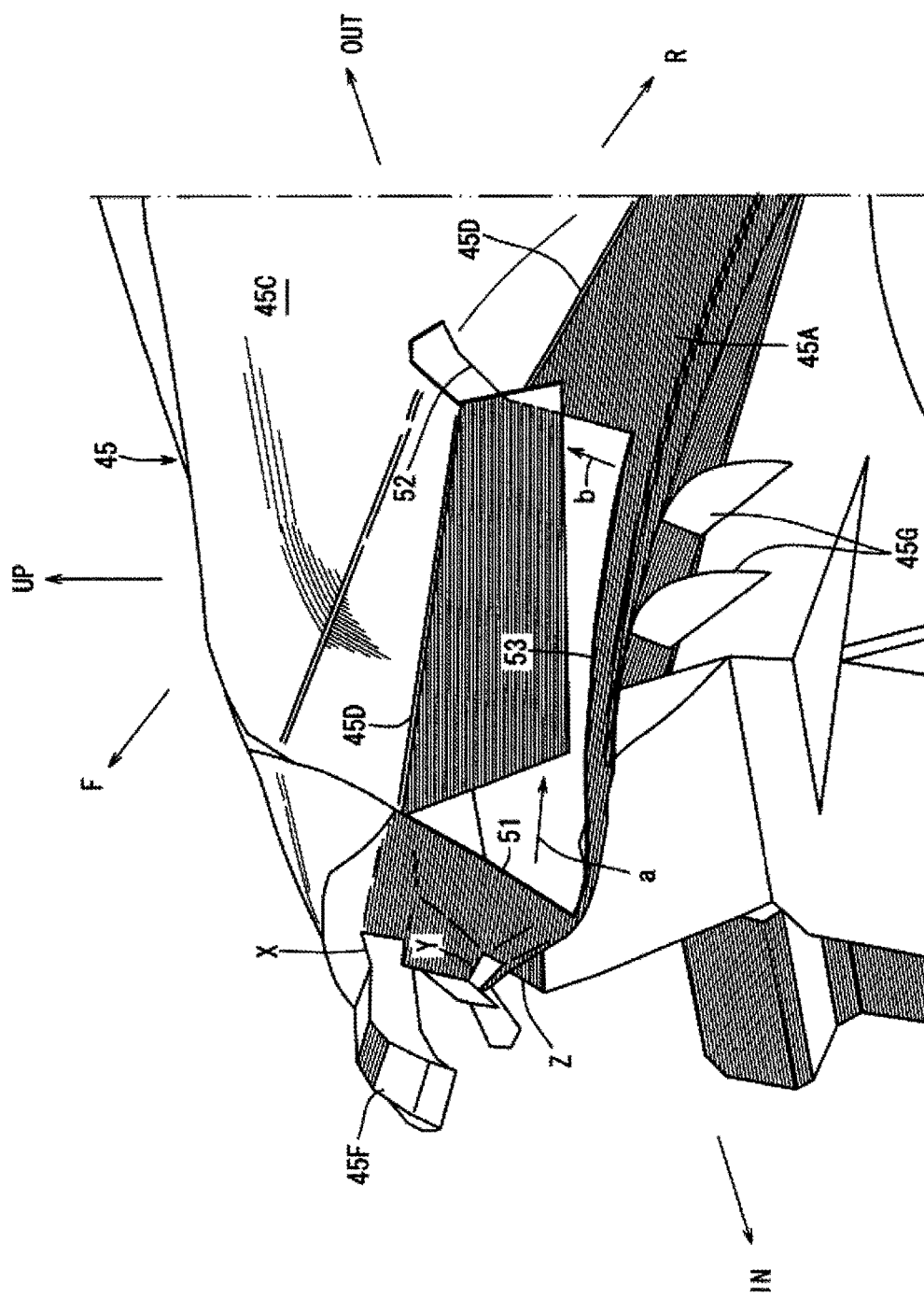
FIG. 12 is a perspective view showing a deformation behavior of the outside air introducing duct.

Further, in addition to the first weak portion 51, the second weak portion 52 and the third weak portion 53 are formed in the outside air introducing duct 45. These weak portions 51, 52, and 53 are continuously formed in a U shape. Therefore, when the collision load is applied to the cowl panel 20, the cowl panel 20 changes from the normal state shown in FIG. 9 to the state shown in FIG. 12. To be specific, a portion of the left side surface 45A which is located immediately behind the first weak portion 51 moves in the rearward direction as shown by an arrow a in FIG. 12, and the portion surrounded by the weak portions 51, 52, and 53 deforms and moves in the upward direction as shown by an arrow b in FIG. 12 as if a lid opens. With this, the bending deformation of the outside air introducing duct 45 can be prevented. Therefore, the protruding portion 22 can smoothly deform to absorb the collision energy. The vertical wall portion 23 can also easily fall in the rearward direction and the downward direction to further absorb the collision energy. In the drawings, a reference sign 45G denotes a reinforcing rib of the outside air introducing duct. In FIG. 2, a reference sign 16 denotes a wiper bracket, and a reference sign 17 denotes a cowl side panel.

As above, the front body structure of the vehicle according to the present embodiment includes: the cowl panel 20 supporting the front window member 11; and the outside air introducing duct 45 of the air conditioner (air conditioning unit 40). The cowl panel 20 includes: the protruding portion 22 which is located under a portion supporting the front window member 11, protrudes in the forward direction, and is provided with the opening portion 25; and the vertical wall portion 23 extending in the downward direction from the lower end of the protruding portion 22. The outside air introducing duct 45 includes: the opening connected to the opening portion 25; and the deformation promoting portion (first weak portion 51) formed on at least one (left side surface 45A) of the vehicle-width-direction side surfaces of the outside air introducing duct 45 and configured to promote the rearward displacement of the opening when the protruding portion 22 receives the collision load from outside (see FIGS. 1 and 5).

According to this configuration, the deformation promoting portion (first weak portion 51) is formed at the outside air introducing duct 45. Therefore, when the protruding portion 22 of the cowl panel 20 receives the collision load from outside, the opening side of the outside air introducing duct 45, that is, the front end portion of the outside air introducing duct 45 moves toward the rear side of the vehicle body, and the rearward deformation of the outside air introducing duct 45 occurs. Therefore, the outside air introducing duct 45 can be prevented from being sandwiched by the protruding portion 22 of the cowl panel 20, so that the bending deformation of the outside air introducing duct 45 can be prevented. As a result, the cowl panel 20 can absorb the collision energy by the deformation of the protruding portion 22. Thus, the pedestrian protection performance can be improved. The deformation promoting portion of the present embodiment includes the first weak portion 51 extending in the upward/downward direction (see FIGS. 1 and 9).

According to this configuration, the deformation promoting portion includes the first weak portion 51 extending in the upward/downward direction. Therefore, when the protruding portion 22 receives the collision load from outside, the rearward deformation of the outside air introducing duct 45 occurs, and the outside air introducing duct 45 is hardly sandwiched by the protruding portion 22 of the duct 45. On this account, the bending deformation of the protruding portion 22 of the cowl panel 20 can be prevented, and the pedestrian protection performance can be improved. Further, the deformation promoting portion of the present embodiment includes: the second weak portion 52 located behind the first weak portion 51 and extending in the upward/downward direction; and the third weak portion 53 extending in the forward/rearward direction and connecting the lower end of the first weak portion 51 and the lower end of the second weak portion 52 to each other (see FIGS. 1 and 9).

According to this configuration, the first weak portion 51, the second weak portion 52, and the third weak portion 53 are continuously formed in a U shape in a side view. Therefore, when the collision load is applied to the cowl panel 20, the predetermined portion of the outside air introducing duct 45 which is surrounded by the first, second, and third weak portions 51, 52, and 53 moves in the rearward direction as if a lid opens. On this account, the rearward movement of the portion of the outside air introducing duct 45 which is located inside the protruding portion 22 of the cowl panel 20 is further facilitated. Further, since the predetermined portion deforms as if a lid opens, the bending deformation of the outside air introducing duct 45 is suppressed. Furthermore, according to the outside air introducing duct 45 of the present embodiment, the corner portion 45D is formed between the side surface (left side surface 45A) and the upper surface 45C, and the deformation promoting portion (the first weak portion 51, the second weak portion 52) is formed so as to continuously extend from the side surface (left side surface 45A) through the corner portion 45D to the upper surface 45C (see FIGS. 1 and 9).

According to this configuration, the deformation promoting portion is formed so as to continuously extend from the side surface (left side surface 45A) of the duct 45 through the corner portion 45D to the upper surface 45C of the duct 45. Therefore, even in a case where the outside air introducing duct 45 includes the corner portion 45D, the bending deformation of the outside air introducing duct 45 can be further securely prevented. As a result, it is possible to prevent a case where the rearward deformation of the outside air introducing duct 45 is inhibited by the corner portion 45D of the outside air introducing duct 45. In addition, the deformation promoting portion of the present embodiment is located behind the protruding portion 22 of the cowl panel 20 (see FIG. 1).

According to this configuration, the deformation promoting portion (first weak portion 51) is located behind the protruding portion 22 of the cowl panel 20. Therefore, when the collision load is applied to the cowl panel 20, the portion of the outside air introducing duct 45 which is located inside the protruding portion 22 moves in the rearward direction. Thus, the rearward deformation of the outside air introducing duct 45 occurs. Therefore, the pedestrian protection performance of the cowl panel 20 can be further improved.

Regarding the correspondence between the configuration of the present invention and the above embodiment, the air conditioner of the present invention corresponds to the air conditioning unit 40 of the embodiment. Similarly, at least one of the vehicle-width-direction side surfaces of the outside air introducing duct corresponds to the left side surface 45A, and the deformation promoting portion corresponds to the first weak portion 51, the second weak portion 52, and the third weak portion 53. However, the present invention is not limited to the configuration of the above embodiment.

Figure 13:
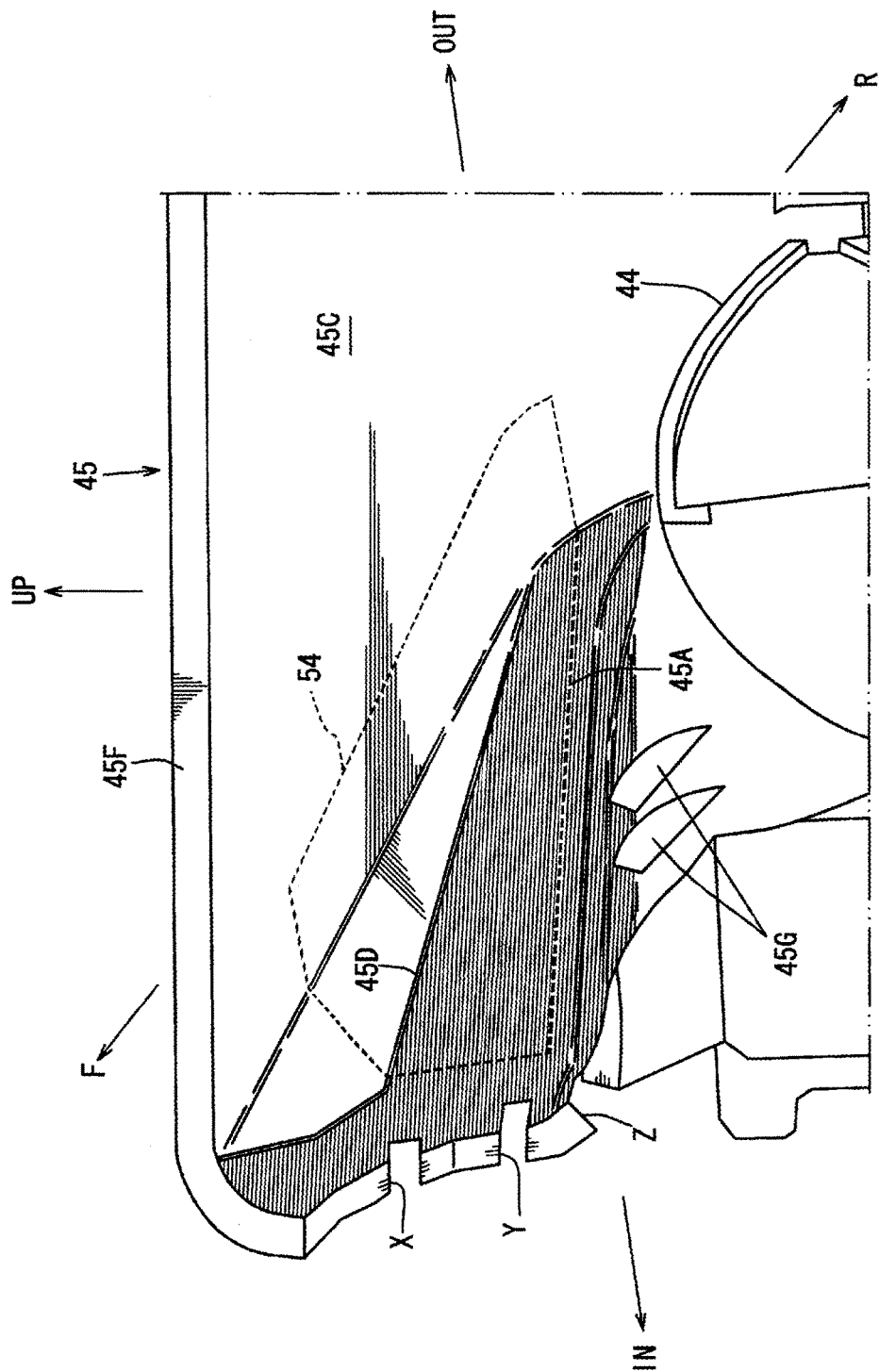
FIG. 13 corresponds to FIG. 9 and is a perspective view showing the outside air introducing duct according to another embodiment.
Figure 14:
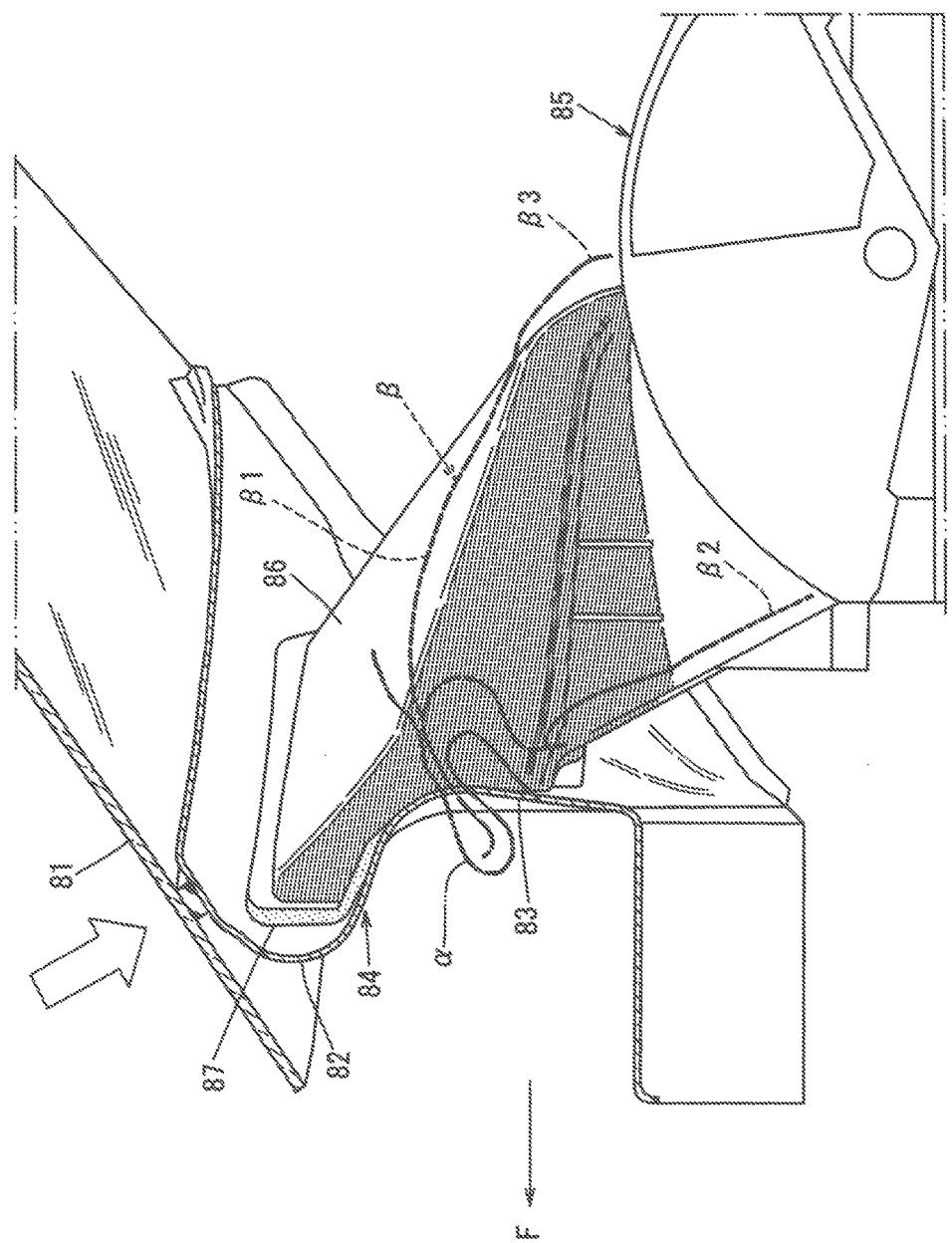
FIG. 14 is a side view showing the front body structure of the vehicle according to a Comparative Example.

For example, in the above embodiment, the deformation promoting portion is formed only on one (left side surface 45A) of the vehicle-width-direction side surfaces of the outside air introducing duct 45. However, the deformation promoting portion may be formed on each of both left and right vehicle-width-direction side surfaces 45A and 45B of the outside air introducing duct 45. Instead of the weak portion constituted by the slit of the above embodiment, the deformation promoting portion may be constituted by another weak portion constituted by a thin portion, a V-shaped notch, or the like. As one example, a wall surface in a range shown by a broken line in FIG. 13 may be formed by a fourth weak portion 54 that is thinner than each of a wall portion of the main body of the air conditioning unit 40 and the opening of the outside air introducing duct 45. To be specific, the fourth weak portion 54 may be formed so as to extend from the side surface (left side surface 45A) of the duct 45 through the corner portion 45D to the upper surface 45C of the duct 45. Even in this configuration, the bending deformation of the outside air introducing duct 45 by the formation of the corner portion 45D can be prevented, and the rearward deformation can be promoted. In this case, it is preferable that the fourth weak portion 54 that is the deformation promoting portion be formed behind the protruding portion 22 of the cowl panel 20. Further, the vehicle of the above embodiment is the left hand drive vehicle but may be a right hand drive vehicle. To be specific, the front body structure of the vehicle of the present invention may be applied to the right hand drive vehicle in which the outside air introducing duct of the air conditioner is located at a left side of the vehicle.

INDUSTRIAL APPLICABILITY

As explained above, the present invention is useful for a front body structure of a vehicle, the front body structure including: a cowl panel supporting a front window member from below; and an outside air introducing duct of an air conditioner, the outside air introducing duct being connected to the cowl panel.

REFERENCE CHARACTER LIST 11 front window member
20 cowl panel
22 protruding portion
23 vertical wall portion
25 opening portion
40 air conditioning unit (air conditioner)
45 outside air introducing duct
45A left side surface (one of side surfaces)
45C upper surface
45D corner portion
51 first weak portion (deformation promoting portion)
52 second weak portion (deformation promoting portion)
53 third weak portion (deformation promoting portion)
54 fourth weak portion (deformation promoting portion)

The invention claimed is:
1. A front body structure of a vehicle with a front side and a rear side,
the front body structure comprising:
a cowl panel supporting a front window member; and
an outside air introducing duct of an air conditioner,
wherein:
the cowl panel includes
a protruding portion which is located under a portion supporting the front window member, protrudes in a forward direction, and is provided with an opening portion, and
a vertical wall portion extending in a downward direction from a lower end of the protruding portion;
the outside air introducing duct includes
an opening connected to the opening portion, and
a deformation promoting portion formed on at least one of vehicle-width-direction side surfaces of the outside air introducing duct and configured to promote rearward displacement of the opening when the protruding portion receives a collision load from outside;
the deformation promoting portion includes
a first weak portion extending in an upward/downward direction,
a second weak portion located behind the first weak portion at a rear side thereof and extending in the upward/downward direction, and
a third weak portion extending in a forward/rearward direction and connecting a lower end of the first weak portion and a lower end of the second weak portion to each other; and
the deformation promoting portion is located behind the protruding portion of the cowl panel at a rear side thereof, so that the protruding portion provides clearance between the opening portion and the deformation promoting portion.
2. The front body structure according to claim 1, wherein the deformation promoting portion is a thin portion.
3. The front body structure according claim 1, wherein:
the outside air introducing duct includes a corner portion between one of the side surfaces and an upper surface of the outside air introducing duct; and
the deformation promoting portion is formed so as to continuously extend from the side surface through the corner portion to the upper surface.
4. The front body structure according to claim 1, wherein the opening portion of the cowl panel is formed so as to extend from the protruding portion to the vertical wall portion.
5. The front body structure according to claim 1, wherein the outside air introducing duct extends from an air conditioner main body in the forward direction and the upward direction.

* * * * *